United States Patent
Chen

(10) Patent No.: US 9,836,090 B2
(45) Date of Patent: Dec. 5, 2017

(54) ELECTRONIC DEVICE AND METHOD FOR CONTROLLING THE SAME

(71) Applicants: Beijing Lenovo Software Ltd., Beijing (CN); Lenovo (Beijing) Limited, Beijing (CN)

(72) Inventor: Chen Chen, Beijing (CN)

(73) Assignees: Beijing Lenovo Software Ltd., Beijing (CN); Lenovo (Beijing) Limited, Beijing (CN)

( * ) Notice: Subject to any disclaimer, the term of this patent is extended or adjusted under 35 U.S.C. 154(b) by 0 days.

(21) Appl. No.: 14/974,021

(22) Filed: Dec. 18, 2015

(65) Prior Publication Data

US 2017/0083053 A1    Mar. 23, 2017

(30) Foreign Application Priority Data

Sep. 21, 2015  (CN) .......................... 2015 1 0603919

(51) Int. Cl.
   *G06F 1/16*   (2006.01)
   *G06F 11/30*  (2006.01)
   *G06F 3/041*  (2006.01)

(52) U.S. Cl.
   CPC .......... *G06F 1/1656* (2013.01); *G06F 1/1626* (2013.01); *G06F 1/1637* (2013.01); *G06F 1/1694* (2013.01); *G06F 3/0414* (2013.01); *G06F 11/3058* (2013.01)

(58) Field of Classification Search
   CPC ........................... G06F 11/3058; G06F 1/1656
   See application file for complete search history.

(56) References Cited

U.S. PATENT DOCUMENTS

| 5,526,208 | A  | * | 6/1996 | Hatch ................. | G11B 5/4846 360/245.8 |
| 5,541,372 | A  | * | 7/1996 | Bailer .................. | G06F 3/0414 178/18.01 |
| 6,760,649 | B2 | * | 7/2004 | Cohen ................. | G05D 23/1928 700/299 |
| 7,197,406 | B2 | * | 3/2007 | Kelso .................. | G06F 11/3058 701/25 |
| 7,252,313 | B2 | * | 8/2007 | Browne ............... | B29C 33/308 293/128 |
| 2003/0179543 | A1 | * | 9/2003 | Sri-Jayantha ......... | G06F 1/1656 361/679.35 |
| 2004/0261411 | A1 | * | 12/2004 | MacGregor ............ | F03G 7/065 60/527 |

(Continued)

*Primary Examiner* — Adrian S Wilson
(74) *Attorney, Agent, or Firm* — Schwegman Lundberg & Woessner, P.A.

(57) ABSTRACT

The present disclosure provides an electronic device and a method for controlling the electronic device, capable of solving the problem that the screen of the electronic device is fragile in use. The electronic device comprises a display unit having an electro-deformable layer provided on its surface. The method comprises: detecting a state parameter of the electronic device; determining whether the electronic device is in a predetermined state based on the state parameter; and applying, upon determining that the electronic device is in the predetermined state, a predetermined current to the electro-deformable layer, such that a strength of the electro-deformable layer is increased from a first, default strength to a second strength.

14 Claims, 2 Drawing Sheets

(56) References Cited

U.S. PATENT DOCUMENTS

| | | | |
|---|---|---|---|
| 2006/0042996 A1* | 3/2006 | Picot | A45C 13/02 206/586 |
| 2006/0125291 A1* | 6/2006 | Buravalla | B62D 21/15 296/204 |
| 2007/0144933 A1* | 6/2007 | Hyde | A41D 13/018 206/522 |
| 2007/0236450 A1* | 10/2007 | Colgate | G06F 3/016 345/156 |
| 2007/0257410 A1* | 11/2007 | Toh | F16F 1/3605 267/153 |
| 2008/0024963 A1* | 1/2008 | Weksler | G06F 1/1616 361/679.01 |
| 2010/0156843 A1* | 6/2010 | Paleczny | G06F 3/016 345/174 |
| 2010/0220404 A1* | 9/2010 | Ugawa | G02B 7/102 359/824 |
| 2015/0001019 A1* | 1/2015 | Hyde | B60R 21/0134 188/371 |

* cited by examiner

ELECTRONIC DEVICE AND METHOD FOR CONTROLLING THE SAME

CROSS-REFERENCE TO RELATED APPLICATION(S)

This application claims priority to the Chinese Patent Application No. 201510603919.4, filed on Sep. 21, 2015, entitled "ELECTRONIC DEVICE AND METHOD FOR CONTROLLING SAME" which is incorporated herein by reference in its entirety.

TECHNICAL FIELD

The present disclosure relates to electronics technology, and more particularly, to an electronic device and a method for controlling the electronic device.

BACKGROUND

With the rapid development of electronics technology, electronic devices, such as smartphones, tablet computers and smart watches, become increasingly popular and make people's daily lives more convenient.

At present, electronic devices typically have screens made of glass panels or polymer layers. Due to very low strength of such compositions, the screens of electronic devices may be easily damaged in use.

SUMMARY

It is an object of the embodiments of the present disclosure to provide an electronic device and a method for controlling the electronic device, capable of solving the above problem associated with fragility of the screens of electronic devices in use.

In a first aspect, an electronic device is provided according to an embodiment of the present disclosure. The electronic device comprises: a display unit having an electro-deformable layer provided on its surface; a detection unit configured to detect a state parameter of the electronic device; a power supply unit configured to supply current; and a processing unit electrically connected with the display unit, the detection unit and the power supply unit, respectively, and configured to determine whether the electronic device is in a predetermined state based on the state parameter and, upon determining that the electronic device is in the predetermined state, instruct the power supply unit to apply a predetermined current to the electro-deformable layer, such that a strength of the electro-deformable layer is increased from a first, default strength to a second strength.

Optionally, the state parameter is a pressure parameter. The detection unit comprises a first detection module configured to detect the pressure parameter on the surface of the display unit. The processing unit is configured to determine whether the electronic device is in the predetermined state based on the state parameter by: determining that the electronic device is in the predetermined state when the pressure parameter is larger than or equal to a predetermined threshold.

Optionally, the state parameter is an orientation parameter. The detection unit comprises a second detection module configured to detect the orientation parameter of the electronic device. The processing unit is configured to determine whether the electronic device is in the predetermined state based on the state parameter by: determining that the electronic device is in the predetermined state when the orientation parameter indicates that the display unit faces ground.

Optionally, the state parameter is a motion parameter. The detection unit comprises a third detection module configured to detect the motion parameter of the electronic device. The processing unit is configured to determine whether the electronic device is in the predetermined state based on the state parameter by: determining that the electronic device is in the predetermined state when the motion parameter is larger than or equal to a predetermined threshold.

Optionally, the processing unit is further configured to obtain a predetermined instruction and, in response to the predetermined instruction, instruct the power supply unit to apply a predetermined alternating current to the electro-deformable layer, such that a deformation of the electro-deformable layer in a direction perpendicular to the surface of the display unit changes periodically.

Optionally, the processing unit is configured to obtain the predetermined instruction by generating and obtaining the predetermined instruction upon detecting that the display unit has switched from a non-operating state to an operating state.

Optionally, the display unit is an e-paper display screen.

In a second aspect, a method for controlling an electronic device is provided according to an embodiment of the present disclosure. The electronic device comprises a display unit having an electro-deformable layer provided on its surface. The method comprises: detecting a state parameter of the electronic device; determining whether the electronic device is in a predetermined state based on the state parameter; and applying, upon determining that the electronic device is in the predetermined state, a predetermined current to the electro-deformable layer, such that a strength of the electro-deformable layer is increased from a first, default strength to a second strength.

Optionally, the state parameter is a pressure parameter on the surface of the display unit. The step of determining whether the electronic device is in the predetermined state based on the state parameter comprises: determining that the electronic device is in the predetermined state when the pressure parameter is larger than or equal to a predetermined threshold.

Optionally, the state parameter is an orientation parameter of the electronic device. The step of determining whether the electronic device is in the predetermined state based on the state parameter comprises: determining that the electronic device is in the predetermined state when the orientation parameter indicates that the display unit faces ground.

Optionally, the state parameter is a motion parameter of the electronic device. The step of determining whether the electronic device is in the predetermined state based on the state parameter comprises: determining that the electronic device is in the predetermined state when the motion parameter is larger than or equal to a predetermined threshold.

Optionally, the method further comprises: obtaining a predetermined instruction; and applying, in response to the predetermined instruction, a predetermined alternating current to the electro-deformable layer, such that a deformation of the electro-deformable layer in a direction perpendicular to the surface of the display unit changes periodically.

Optionally, the step of obtaining the predetermined instruction comprises: generating and obtaining the predetermined instruction upon detecting that the display unit has switched from a non-operating state to an operating state.

Optionally, the display unit is an e-paper display screen.

BRIEF DESCRIPTION OF THE DRAWINGS

In order to illustrate the solutions according to the embodiments of the present disclosure or the prior art clearly, the figures used for description of the embodiments or the prior art will be introduced briefly here. It is apparent to those skilled in the art that the figures described below only illustrate some embodiments of the present disclosure and other figures can be obtained from these figures without applying any inventive skills.

DETAILED DESCRIPTION OF THE EMBODIMENTS

In the following, the solutions of the present disclosure will be described in detail with reference to the figures and the embodiments. It should be noted that the embodiments of the present disclosure and their specific features are given for illustrating the solutions of the present disclosure and are not intended to limit the scope of the present disclosure. The embodiments of the present disclosure and their specific features can be combined with each other, provided that they do not conflict.

First Embodiment

According to the first embodiment of the present disclosure, an electronic device 100 is provided. The electronic device 100 can be e.g., a smart phone, a smart watch, a tablet computer, a notebook computer, a virtual reality device, and the like.

Figure 1:
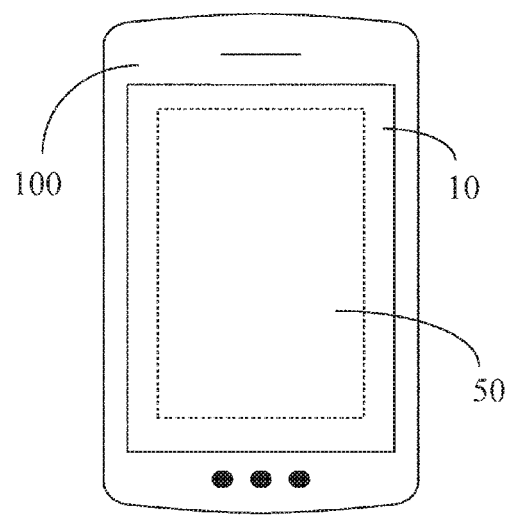
FIG. 1 is a schematic diagram of an electronic device 100 according to an embodiment of the present disclosure.
Figure 2:
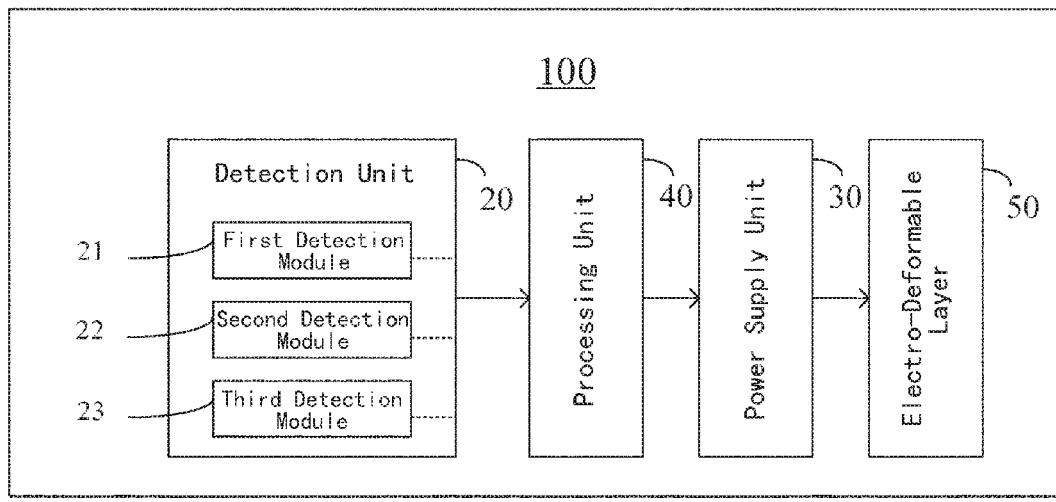
FIG. 2 is another schematic diagram of an electronic device 100 according to an embodiment of the present disclosure.

Referring to FIG. 1 and FIG. 2, the electronic device 100 includes a display unit 10, a detection unit 20, a power supply unit 30 and a processing unit 40.

Here, the display unit 10 can be an electronic paper (or e-paper) display screen, a Liquid Crystal Display (LCD) screen, a Light Emitting Diode (LED) display screen, an Organic Light Emitting Diode (OLED) display screen, and the like.

The display unit 10 has an electro-deformable layer 50 provided on its surface. The electro-deformable layer 50 contains an electrostrictive material which is deformable subject to an electrical field and is typically a material having a high dielectric constant. Optionally, in an embodiment of the present disclosure, the electro-deformable layer 50 contains an electrostrictive material that has a high dielectric constant, a diffusive phase transformation, an average Curie temperature close to ambient temperature and a long diffusion zone. Examples of such materials include, but not limited to, PMNT solid solution, a PMNT-BZN solid solution, and PZT doped with Ban or La.

The detection unit 20 can detect a state parameter of the electronic device 100. The detected state parameter can represent an operating state of the electronic device 100. In an implementation, the detection unit 20 can be a sensor capable of detecting the state parameter of the electronic device 100, such as a pressure sensor, a gyro, an accelerometer and the like.

The power supply unit 30 can be a power source module of the electronic device that is configured to supply current. In an implementation, the power supply unit 30 can include a power storage module and a converter module configured to convert the electrical power in the power storage module into a target current (or voltage).

The processing unit 40 can be a processor or more than one processing elements. For example, the processing unit 40 can be a Central Processing Unit (CPU), an Application Specific Integrated Circuit (ASIC), or one or more integrated circuits configured to implement the embodiments of the present disclosure, e.g., one or more Digital Signal Processors (DSPs) or one or more Field Programmable Gate Arrays (FPGAs).

The processing unit 40 is electrically connected with the display unit 10 and the detection unit 20, respectively, and can obtain the state parameter of the electronic device 100 as detected by the detection unit 20, determine whether the electronic device 100 is in a predetermined state based on the state parameter and, upon determining that the electronic device 100 is in the predetermined state, instruct the power supply unit 30 to apply a predetermined current to the electro-deformable layer 50, such that a strength of the electro-deformable layer 50 is increased from a first, default strength to a second strength.

In particular, the electronic device 100 can have a pre-stored algorithm for determining whether the electronic device 100 is in the predetermined state. The algorithm can be stored in a storage unit of the electronic device, or can be fixed into the processing unit 40. With this algorithm, the processing unit 40 can determine whether the electronic device 100 is in the predetermined state where the display unit 10 of the electronic device 100 could be prone to damage, e.g., when the electronic device 100 is falling or pressed.

When the processing unit 40 determines that the electronic device 100 is in the predetermined state, the display unit 10 is prone to damage. In this case, the processing unit 40 instructs the power supply unit 30 to apply a predetermined current to the electro-deformable layer 50. The specific form of the predetermined current can be set depending on experience values obtained by experiments. When the predetermined current is applied, the structures of the micro particles constituting the electro-deformable layer 50 change, and thus the strength of the electro-deformable layer 50 changes accordingly. The principle for which the strength of the electro-deformable layer 50 changes depending on the applied current is known in the art and details thereof will be omitted here.

The predetermined current (e.g., parameters such as intensity and orientation) for the electro-deformable layer 50 may vary depending on the material or micro structure of the electro-deformable layer 50. In an embodiment of the present disclosure, a predetermined current can be set for the electro-deformable layer 50 included in the electronic device 100, such that, when the predetermined current is applied, the strength of the electro-deformable layer 50 will be increased when compared to the case without the predetermined current, such that the probability that the display unit 10 would be damaged will be reduced and the display unit 10 and the electronic device 100 can be protected.

It is to be noted here that the electronic device 100 is illustrated as a smart phone in FIG. 1 as an example, but the present disclosure is not limited to this. Further, in FIG. 1 the area of the display unit 10 is larger than that of the electro-deformable layer 50, but this is only an exemplary implementation of the relative size between them. In practice, their areas can be the same, or alternatively the area of the electro-deformable layer 50 can be larger than that of the display unit 10, so as to ensure that the display unit 10 would be fully covered by the electro-deformable layer 50.

Optionally, in an embodiment of the present disclosure, the state parameter can be a pressure parameter. Referring to FIG. 2 again, the detection unit 10 can include a first detection module 21 configured to detect the pressure parameter on the surface of the display unit 10.

The processing unit 40 is configured to determine whether the electronic device 100 is in the predetermined state based on the state parameter by: determining that the electronic device 100 is in the predetermined state when the pressure parameter is larger than or equal to a predetermined threshold.

In particular, the first detection module 21 can be a sensor module for pressure detection. For its implementation, reference can be made to the existing pressure sensor technique and details thereof will be omitted here. Once the first detection module 21 has detected the pressure parameter on the surface of the display unit 10, the processing unit 40 determines whether the pressure parameter is larger than a predetermined threshold. If so, the pressure on the display unit 10 is relatively high and the electronic device 100 is in the predetermined state. In this case, the strength of the electro-deformable layer 50 on the surface of the display unit 10 needs to be increased to protect the display unit 10 from the external pressure and reduce the probability that the display unit 10 would be damaged due to the external pressure.

Here, the predetermined threshold for pressure can be set depending on various factors such as the possible usage environment of the electronic device 100, the pressure bearing capability of the display unit 10, or the value of the first strength.

Alternatively, in an embodiment of the present disclosure, the state parameter can be an orientation parameter. Referring to FIG. 2 again, the detection unit 20 can include a second detection module 22 configured to detect the orientation parameter of the electronic device 100.

The processing unit 40 is configured to determine whether the electronic device 100 is in the predetermined state based on the state parameter by: determining that the electronic device 100 is in the predetermined state when the orientation parameter indicates that the display unit 10 faces ground.

In particular, the second detection module 22 can detect the orientation parameter of the electronic device 10. It can be an orientation sensor or a gravity sensor. The data detected by the second detection module 22 can indicate whether the display unit 10 faces ground. For example, when the display unit 10 is parallel to the horizontal plane and faces ground, or when the display unit 10 forms an acute angle with the horizontal plane and faces ground, the processing unit 40 determines that the electronic device 100 is in the predetermined state.

The display unit 10 is typically in contact with an external object when facing ground, e.g., with a supporting surface such as a table, or with a user's palm when the electronic device 100 is held by the user. In such case, the display unit 10 is prone to scratch or damage by the external object. By applying the predetermined current to the electro-deformable layer 50 on the surface of the electronic device 100, the strength of the electro-deformable layer 50 can be increased to protect the display unit 10. The capability of the display unit 10 to bear external force can be enhanced and the probability that the display unit 10 would be damaged due to external pressure can be reduced.

Alternatively, in an embodiment of the present disclosure, the state parameter can be a motion parameter. Referring to FIG. 2 again, the detection unit 20 can include a third detection module 23 configured to detect the motion parameter of the electronic device 100.

The processing unit 40 is configured to determine whether the electronic device 100 is in the predetermined state based on the state parameter by: determining that the electronic device 100 is in the predetermined state when the motion parameter is larger than or equal to a predetermined threshold.

In particular, the third detection module 23 can be a sensor unit capable of detecting the motion parameter, e.g., speed or acceleration, of the electronic device 100, e.g., an accelerometer, a gyro sensor, a linear accelerometer or a rotation vector sensor. Once the third detection module 23 has detected the motion parameter, the processing unit 40 determines whether the motion parameter is larger than or equal to a predetermined threshold. If so, it determines that the electronic device 100 is in the predetermined state.

When the speed or acceleration of the electronic device 100 is so high that it could be thrown out or is being thrown out, it is very likely that the display unit 10 would be damaged if the electronic device 100 is thrown out and collides with an external object. In an embodiment of the present disclosure, by applying the predetermined current to the electro-deformable layer 50 on the surface of the display unit 10, the strength of the electro-deformable layer 50 can be increased to the second strength to protect the display unit 10 and reduce the probability that the display unit 10 would be damaged.

Optionally, in another embodiment, after determining that the motion parameter obtained by the detection unit 20 reaches the predetermined threshold, the processing unit 40 instructs the power supply unit 30 to apply, to the electro-deformable layer 50, the predetermined current which can not only increase the strength of the electro-deformable layer 50, but also cause the electro-deformable layer 50 to expand outwards in a direction perpendicular to the surface of the display unit 10, such that the electro-deformable layer 50 could act as a cushion to an external force. In this way, the force transferred to the structure of the display unit 10 beneath the electro-deformable layer 50 can be reduced, so as to protect the display unit 10 and reduce the probability that the display unit 10 would be damaged.

Optionally, in another embodiment, the processing unit 40 is further configured to obtain a predetermined instruction and, in response to the predetermined instruction, apply a predetermined alternating current to the electro-deformable layer 50, such that a deformation of the electro-deformable layer 50 in a direction perpendicular to the surface of the display unit 10 changes periodically.

In particular, the electro-deformable layer 50 may include a first type of composition particles, which, by virtue of their own characteristics or the specific arrangement among the particles, expand laterally in the plane of the electro-deformable layer 50 when the current is applied. The electro-deformable layer 50 may further include a second type of composition particles, which, by virtue of their own characteristics or the specific arrangement among the particles, expand longitudinally in a direction perpendicular to the electro-deformable layer 50 when the current is applied. As a result, in the macro-scale, the electro-deformable layer 50 expands in the direction perpendicular to the surface of the electro-deformable layer 50. Either of the above schemes can increase the strength of the electro-deformable layer 50. In practice, the electro-deformable layer 50 can include either one or both of the above types of particles, so as to achieve the lateral and longitudinal deformations.

When the electro-deformable layer 50 can expand/contract in the direction perpendicular to the surface of the electro-deformable layer 50, by applying the predetermined alternating current to the electro-deformable layer 50, the longitudinal deformation of the electro-deformable layer 50 may change cyclically. That is, the electro-deformable layer 50 first expands longitudinally, then contracts, then expands again, and so on, until the predetermined alternating current is terminated. Here, the predetermined alternating current can be determined based on factors such as the electrostrictive performance of the electro-deformable layer 50 and the desired longitudinal expansion/contraction amount.

By applying the predetermined alternating current to the electro-deformable layer 50 such that the deformation of the electro-deformable layer 50 in the direction perpendicular to the surface of the display unit 10 changes periodically, i.e., by causing the electro-deformable layer 50 to "shake", it is possible to clear the tiny dust on the electro-deformable layer 50 away. That is, it has an effect of clearing dust and dirt away, allowing the electronic device 100 to be cleaned automatically.

Here, the predetermined instruction obtained by the processing unit 40 can be an instruction input by the user via an input operation. For example, when the voice input module of the electronic device 100 detects voice information input by the user, it can convert the voice information into the predetermined instruction.

Further, the predetermined instruction obtained by the processing unit 40 can alternatively be generated by the processing unit 40 itself based on the actual operating state of the electronic device 100. That is, the processing unit 40 can be configured to obtain the predetermined instruction by generating and obtaining the predetermined instruction upon detecting that the display unit 10 has switched from a non-operating state to an operating state.

In particular, the non-operating state of the display unit 10 can be an "unlighted" black-screen state of the display unit 10. Correspondingly, the operating state of the display unit 10 can be a "lighted" state of the display unit 10 for display. Alternatively, the non-operating state of the display unit 10 can be a state where the display unit 10 faces ground (or where the display unit 10 is in contact with a supporting surface such as a table). Correspondingly, the operating state of the display unit 10 can be a state where the display unit 10 faces away from ground. Alternatively, the non-operating state of the display unit 10 can be a state where the display unit 10 has not updated its display parameters for a predetermined time period, i.e., a state where the display unit 10 has displayed one single picture for a long time; whereas the operating state of the display unit 10 can be a state where the display unit 10 has updated its display parameters (including display objects, or display luminance or color). In an implementation, the non-operating state of the display unit 10 can be a state where the display unit 10 is not watched by the user. Correspondingly, the operating state of the display unit 10 can be a state where the display unit 10 is being watched by the user. Details of these implementations will be omitted here.

Upon detecting that the display unit 10 has switched from a non-operating state to an operating state, the processing unit 40 itself can generate and obtain the predetermined instruction and, in response to the predetermined instruction, instruct the power supply unit 30 to apply the predetermined alternating current to the electro-deformable layer 50. In this way, when detecting that the user is about to use the display unit 10, the electronic device 100 can clean the display unit 10 automatically.

Optionally, in an embodiment of the present disclosure, the display unit 10 can be an e-paper display screen. Here, the structure and implementation of the e-paper display screen are known in the art and details thereof will be omitted here.

Optionally, in an embodiment of the present disclosure, the deformable layer of the electronic device 100 has a predetermined light transmittance, such that the user can view the display content beneath the electro-deformable layer 50.

Optionally, in an embodiment of the present disclosure, the electronic device 100 includes two or more display units, one of which is the display unit 10. Alternatively, each of these display units has an electro-deformable layer 50 for protection.

Optionally, in an embodiment of the present disclosure, the display unit 10 is a touch screen.

Optionally, in an embodiment of the present disclosure, the electronic device 100 further includes a storage unit, which can be a storage device or a plurality of storage elements, for storing executable program codes and parameters and data required for an access network device or terminal to operate. The storage unit can include a Random Access Memory (RAM) or a Non-Volatile Memory (NVM), such as a disk memory or a flash memory.

Second Embodiment

Figure 3:
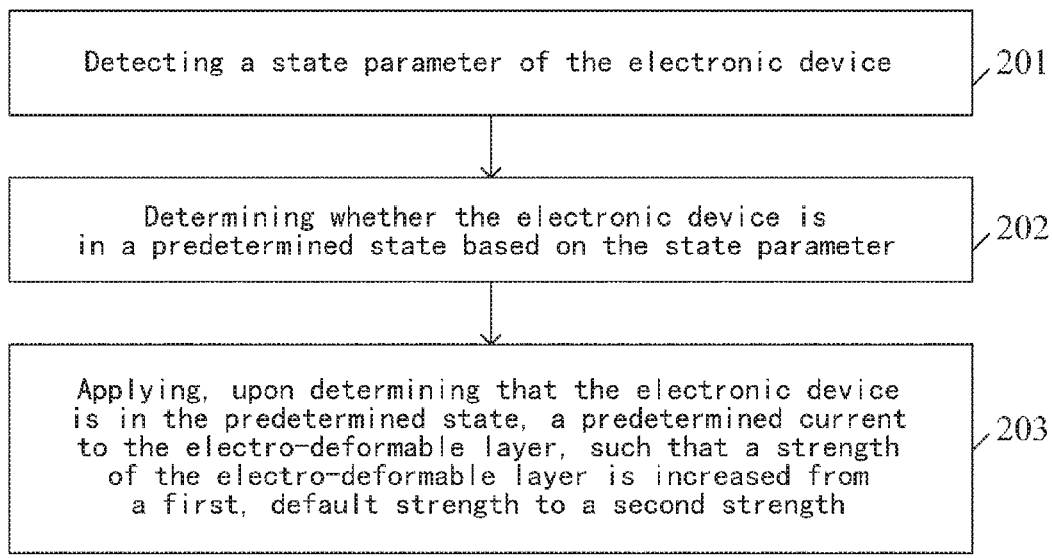
FIG. 3 is a flowchart illustrating a method for controlling an electronic device according to an embodiment of the present disclosure.

Based on the same inventive concept, the second embodiment of the present disclosure provides a method for controlling an electronic device. FIG. 3 is a flowchart illustrating the method. The method includes the following steps.

At step 201, a state parameter of the electronic device is detected.

At step 202, it is determined whether the electronic device is in a predetermined state based on the state parameter.

At step 203, when it is determined that the electronic device is in the predetermined state, a predetermined current is applied to the electro-deformable layer, such that a strength of the electro-deformable layer is increased from a first, default strength to a second strength.

Here, for the implementations of the steps 201-203, reference can be made to the implementations of the electronic device 100 in the first embodiment and the description thereof will be omitted here.

Optionally, in an embodiment of the present disclosure, the state parameter is a pressure parameter on the surface of the display unit. The step 202 of determining whether the electronic device is in the predetermined state based on the state parameter includes: determining that the electronic device is in the predetermined state when the pressure parameter is larger than or equal to a predetermined threshold.

Optionally, in an embodiment of the present disclosure, the state parameter is an orientation parameter of the electronic device. The step 202 of determining whether the electronic device is in the predetermined state based on the state parameter comprises: determining that the electronic device is in the predetermined state when the orientation parameter indicates that the display unit faces ground.

Optionally, in an embodiment of the present disclosure, the state parameter is a motion parameter of the electronic device. The step of determining whether the electronic device is in the predetermined state based on the state parameter comprises: determining that the electronic device is in the predetermined state when the motion parameter is larger than or equal to a predetermined threshold.

Figure 4:
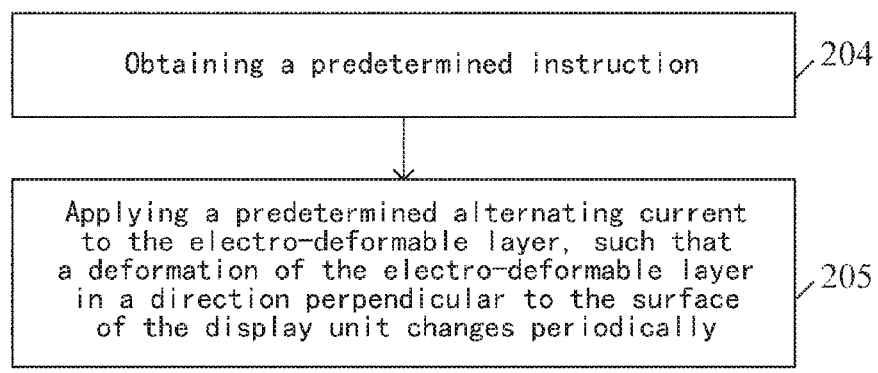
FIG. 4 is another flowchart illustrating a method for controlling an electronic device according to an embodiment of the present disclosure.

Optionally, referring to FIG. 4, the method for controlling the electronic device according to the second embodiment of the present disclosure further includes the following steps.

At 204, a predetermined instruction is obtained.

At 205, a predetermined alternating current is applied to the electro-deformable layer, such that a deformation of the electro-deformable layer in a direction perpendicular to the surface of the display unit changes periodically.

Optionally, in an embodiment of the present disclosure, the step 204 of obtaining the predetermined instruction includes: generating and obtaining the predetermined instruction upon detecting that the display unit has switched from a non-operating state to an operating state.

Optionally, in an embodiment of the present disclosure, the display unit is an e-paper display screen.

The method for controlling the electronic device in the second embodiment and the electronic device 100 in the first embodiment belong to two aspects based on one single inventive concept. The structure and implementation of the electronic device 100 have been explained in detail previously. The implementation of the method according to the second embodiment can be understood by those skilled in the art with reference to the previous description and thus will be omitted here for the purpose of conciseness.

One or more solutions according to the embodiments of the present disclosure have at least the following technical effects or advantages.

With the solutions according to the embodiments of the present disclosure, the electronic device can detect its state parameter and determines whether it is in a predetermined state based on the state parameter. Upon determining that it is in the predetermined state, it applies a predetermined current to an electro-deformable layer provided on the surface of the display unit, such that the strength of the electro-deformable layer is increased from a first, default strength to a second strength. With the high-strength electro-deformable layer, the display unit can be protected, so as to reduce the probability that the display unit would be damaged.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage medium (including, but not limited to, magnetic disk storage, CD-ROM, optical storage) containing computer readable program codes.

The present disclosure have been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by the computer or the processor of any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute an article of manufacture including instruction means for implementing the functions specified by one or more processes in the flowcharts and/or one or more blocks in the block diagrams.

While the preferred embodiments of the present disclosure have been described above, various modifications and alternatives to these embodiments can be made by those skilled in the art based on the fundamental inventive concept. Therefore, these preferred embodiments and all the modifications and alternatives falling within the scope of the present disclosure are to be encompassed by the claims as attached.

Obviously, various modifications and alternatives can be made to the present disclosure by those skilled in the art without departing from the spirit and scope of the present disclosure. Therefore, these modifications and alternatives are to be encompassed by the present disclosure if they fall within the scope of the claims and their equivalents.

What is claimed is:

1. An electronic device, comprising:
   a display unit having an electro-deformable layer provided on its surface, the electro-deformable layer comprising electrostrictive material that has high dielectric constant and diffusive phase transformation;
   a detection unit configured to detect a state parameter of the electronic device;
   a power supply unit configured to supply current; and
   a processing unit electrically connected with the display unit, the detection unit and the power supply unit, respectively, and configured to determine whether the electronic device is in a predetermined state based on the state parameter and, upon determining that the electronic device is in the predetermined state, instruct the power supply unit to apply a predetermined current to the electro-deformable layer, such that a strength of the electro-deformable layer is increased from a first, default strength to a second strength.

2. The electronic device of claim 1, wherein the state parameter is a pressure parameter,
   the detection unit comprises a first detection module configured to detect the pressure parameter on the surface of the display unit; and
   the processing unit is configured to determine whether the electronic device is in the predetermined state based on the state parameter by: determining that the electronic device is in the predetermined state when the pressure parameter is larger than or equal to a predetermined threshold.

3. The electronic device of claim 1, wherein the state parameter is an orientation parameter,
   the detection unit comprises a second detection module configured to detect the orientation parameter of the electronic device; and
   the processing unit is configured to determine whether the electronic device is in the predetermined state based on the state parameter by: determining that the electronic device is in the predetermined state when the orientation parameter indicates that the display unit faces ground.

4. The electronic device of claim 1, wherein the state parameter is a motion parameter,
the detection unit comprises a third detection module configured to detect the motion parameter of the electronic device; and
the processing unit is configured to determine whether the electronic device is in the predetermined state based on the state parameter by: determining that the electronic device is in the predetermined state when the motion parameter is larger than or equal to a predetermined threshold.

5. The electronic device of claim 1, wherein the processing unit is further configured to:
obtain a predetermined instruction and; in response to the predetermined instruction; instruct the power supply unit to apply a predetermined alternating current to the electro-deformable layer, such that a deformation of the electro-deformable layer in a direction perpendicular to the surface of the display unit changes periodically.

6. The electronic device of claim 5, wherein the processing unit is configured to obtain the predetermined instruction by generating and obtaining the predetermined instruction upon detecting that the display unit has switched from a non-operating state to an operating state.

7. The electronic device of claim 1, wherein the display unit is an e-paper display screen.

8. A method for controlling an electronic device, the electronic device comprising a display unit having an electro-deformable layer provided on its surface, the electro-deformable layer comprising electrostrictive material that has high dielectric constant and diffusive phase transformation, the method comprising:
detecting a state parameter of the electronic device;
determining whether the electronic device is in a predetermined state based on the state parameter; and
applying, upon determining that the electronic device is in the predetermined state, a predetermined current to the electro-deformable layer, such that a strength of the electro-deformable layer is increased from a first, default strength to a second strength.

9. The method of claim 8, wherein the state parameter is a pressure parameter on the surface of the display unit, and
said determining whether the electronic device is in the predetermined state based on the state parameter comprises: determining that the electronic device is in the predetermined state when the pressure parameter is larger than or equal to a predetermined threshold.

10. The method of claim 8, wherein the state parameter is an orientation parameter of the electronic device, and
said determining whether the electronic device is in the predetermined state based on the state parameter comprises: determining that the electronic device is in the predetermined state when the orientation parameter indicates that the display unit faces ground.

11. The method of claim 8, wherein the state parameter is a motion parameter of the electronic device, and
said determining whether the electronic device is in the predetermined state based on the state parameter comprises: determining that the electronic device is in the predetermined state when the motion parameter is larger than or equal to a predetermined threshold.

12. The method of claim 8, further comprising:
obtaining a predetermined instruction; and
applying, in response to the predetermined instruction, a predetermined alternating current to the electro-deformable layer, such that a deformation of the electro-deformable layer in a direction perpendicular to the surface of the display unit changes periodically.

13. The method of claim 12, wherein said obtaining the predetermined instruction comprises: generating and obtaining the predetermined instruction upon detecting that the display unit has switched from a non-operating state to an operating state.

14. The method of claim 8, wherein the display unit is an e-paper display screen.

* * * * *